United States Patent [19]
Railey

[11] Patent Number: 5,766,412
[45] Date of Patent: Jun. 16, 1998

[54] SYSTEM AND METHOD OF WASTER WATER REDUCTION AND PRODUCT RECOVERY

[75] Inventor: Jay M. Railey, Charlotte, N.C.

[73] Assignee: Recovery Technologies Corporation, Charlotte, N.C.

[21] Appl. No.: 782,401

[22] Filed: Jan. 13, 1997

[51] Int. Cl.$^6$ ................................................ B01D 1/00
[52] U.S. Cl. .................... 159/47.3; 159/5; 159/7; 159/24.3; 202/182; 202/205; 203/89; 208/184
[58] Field of Search ........................... 159/5, 7, 47.3, 159/24.3, DIG. 10; 202/182, 185.1, 205, 236; 203/89; 208/179, 184

[56] References Cited

U.S. PATENT DOCUMENTS

| | | |
|---|---|---|
| 4,053,006 | 10/1977 | Tkac et al. . |
| 4,080,247 | 3/1978 | Malakul . |
| 4,314,877 | 2/1982 | Queiser ............................. 159/47.3 |
| 4,360,420 | 11/1982 | Fletcher et al. . |
| 4,366,049 | 12/1982 | Knorre et al. . |
| 4,504,361 | 3/1985 | Tkac et al. . |
| 5,124,004 | 6/1992 | Grethlein et al. . |
| 5,376,262 | 12/1994 | Perry ................................. 210/651 |
| 5,380,402 | 1/1995 | Ryham et al. ..................... 162/30.1 |
| 5,445,714 | 8/1995 | Myers ................................ 202/176 |

Primary Examiner—Christopher Kim
Attorney, Agent, or Firm—Kennedy Covington Lobdell & Hickman LLP

[57] ABSTRACT

A system is disclosed for reducing the amount of waste water and recovering reusable constituents from a waste stream comprising at least two constituents having different relative volatilities. The system includes a vapor thermocompression evaporator, into which the waste stream is directed, to vaporize one of the constituents within the waste stream without appreciably vaporizing other constituents in the waste stream. The vapor thermocompression evaporator also has a vapor compressor for compressing the vaporized fraction of the first constituent and delivering this compressed vaporized fraction to transfer heat to the waste stream. The system further has a film evaporator in series with the vapor thermocompression evaporator which transfers heat to the stream after it leaves the vapor thermocompression to vaporize substantially all of the first constituent without appreciably vaporizing the second constituent. There is a also a second vapor compressor in communication with the film evaporator for compressing the vaporized first constituent from the film evaporator and delivering the compressed vaporized first constituent to either the vapor thermocompression evaporator or the film evaporator in order to transfer heat to the stream therein.

3 Claims, 2 Drawing Sheets

SYSTEM AND METHOD OF WASTER WATER REDUCTION AND PRODUCT RECOVERY

BACKGROUND OF THE INVENTION

The present invention relates to a system and method to reduce waste water and recover reusable constituents of waste streams. More specifically, the present invention relates to use in series of a vapor thermocompression evaporator, a film evaporator, and a second vapor compressor staged for heat recovery by recycling compressed vapor in the system.

Industry generates millions of gallons of waste water effluent which must be processed by industrial and municipal waste water treatment facilities in the United States. This waste water can include hydrocarbons in dilute concentrations that are discharged by, for example, the chemical industry, the textile industry, metal working applications, and the food processing industry. The hydrocarbon contaminants in this waste water are commercial chemicals that, due to their dilute concentrations, have no apparent commercial value. These chemicals are often valuable alone and in combination and are typically lost upon discharge and processing of the waste water fluid. They are usually processed in waste water treatment plants using chemical and biological means to destroy their hydrocarbon structure and resulting in solid or semi-solid sludge.

Frequently, the hydrocarbons included in waste water streams are expensive functional additives. Most are derived from oil and petrochemical constituents. Surfactants, esters, lubricants, and oils made from these non-renewable sources are already expensive and will become more so as supplies of oil are depleted. From a functional point of view, many of these constituents can, if they are successfully recovered, be used in other applications.

To recover some of the value of these waste hydrocarbons, they must be successfully separated from the water without destruction. Most waste treatment options in effect today effectively destroy or render these valuable hydrocarbons unrecoverable by converting them to sludge by thermally degrading them, chemically or naturally oxidizing them, or chemically changing their structure, as discussed below.

Even if the hydrocarbons are not to be recovered from the waste water, disposal of waste water containing hydrocarbons is generally subject to environmental regulation, and the cost of such disposal is generally based upon the weight and volume of the waste. Since the predominant constituent of such waste streams is water, it is cost efficient to remove as much water as possible from the waste stream prior to disposal. Current methods of water removal include coagulation and flocculation of hydrocarbons within the waste stream, with subsequent filtration of water therefrom. Generally, this results in a fairly wet sludge containing a significant amount of water. This also requires addition of coagulants and flocculants to the waste stream and requires filter replacement and maintenance.

Dilute hydrocarbon wastes are often difficult to treat. They can be high in biochemical oxygen demand and can be resistant to emulsion breaking techniques commonly employed. If discharged to biological waste systems, these dilute hydrocarbons, often present in emulsified form, can cause system upsets, sometimes leading to a total shutdown of the system. Surfactants, hydrocarbons, and oils that are present frequently interrupt life functions of bacteria, leading to "bug kills," which can render the entire waste treatment system inoperative. This then requires reseeding and reclamation of the biological treatment system.

In order to deal with occasional slugs of such problem hydrocarbon effluents, waste treatment facilities may be over designed to provide adequate dilution and capacity. Often, a more practical solution is segregation of effluent streams containing hydrocarbon contaminants, with targeted treatment and recovery methods employed.

A typical hydrocarbon waste treatment approach is to transfer the waste stream containing hydrocarbons to a holding tank, whereupon chemical treatment can be effected to destabilize the hydrocarbon. The destabilizing chemical treatments may be inorganic chemicals or organic polymers designed to counter the effect of ionic emulsifiers present in the stream. After chemical additions are completed, there are subsequent filtration steps, such as using a clarifier or physical filtration system, to separate the solids from the remaining water. This is an inconsistent approach. Some emulsified process streams do not respond to such treatments because of the nature of the emulsifiers present. Multiple acid and caustic treatments may be required prior to attempted destabilization to hydrolyze non-ionic emulsifiers before other methods can begin to be applied. Further, chemicals are usually expensive and result in the creation of another waste product in the form of useless chemical sludges.

This approach has the drawbacks of variability, high cost, and the requirement of constant oversight. Further, additional contaminants are added to the water in the form of salts or dissolved organic polymers. Resultant sludges containing the process components are generally solid or semi-solid and pose a new disposal problem in their own right. Also, the water is usually not clean enough to be discharged or recycled without further complicated treatment.

Another method available to treat waste streams having hydrocarbons and water is to heat the waste stream to vaporize the water therein. Typically, this requires large amounts of energy that render such process prohibitively expensive. Further, this generally does not efficiently remove large enough quantities of water for the process to be cost-effective.

SUMMARY OF THE INVENTION

The present invention addresses the problems identified above by providing a system and method for effectively removing significant amounts of water from waste water streams and recovering valuable hydrocarbon constituents therein. It is an object of the present invention to provide such a method and system that eliminates the above drawbacks of treating waste streams containing hydrocarbons with conventional chemical, biological, and other waste treatment systems. It is a further object of the present invention to reduce the water content in waste streams without destroying the nature of the hydrocarbon constituents contained therein and to effectively recover these hydrocarbon constituents of waste streams in significant yields in a manner that is economical and consistent without requiring continuous oversight. It is a further object of the present invention to recover a significant amount of energy put into the system in the form of heat to vaporize the water in the waste stream and to recycle such heat energy to reduce energy costs typically associated with vaporizing water from a waste stream.

The present invention includes a vapor thermocompression evaporator having a heat absorbing section and a heat releasing section. The heat absorbing section has an inlet for receiving the waste stream and heat transfer surfaces to transfer heat to the waste stream to vaporize a significant fraction of the water in the waste stream without appreciably vaporizing any of the hydrocarbon constituents. The heat absorbing section also has a vapor outlet for exhausting the vaporized water and a liquid outlet for discharge of an intermediate stream containing the hydrocarbons and unvaporized water. The heat releasing section also has an inlet for receiving a fluid having a higher energy than the waste stream and an outlet for discharging this fluid. The heat releasing section also has a heat transfer surface for transferring heat from this fluid to the heat absorbing section to vaporize the water contained therein.

The vapor thermocompression evaporator also has a first vapor compressor in communication with the vapor outlet of the heat absorbing section for compressing the vaporized water and delivering the compressed water vapor to the heat releasing section inlet as the fluid having energy for transfer to the waste stream in the heat absorbing section.

The system has, in series with the vapor thermocompression evaporator, a thin film evaporator having a heat absorbing section and a heat releasing section. This heat absorbing section has an inlet in communication with the liquid outlet of the heat absorbing section of the vapor thermocompression evaporator for receiving the intermediate stream, and a heat transfer surface for transferring heat to the intermediate stream to vaporize substantially all of the water vapor in the intermediate stream without appreciably vaporizing any hydrocarbons contained therein. The heat absorbing section also has a vapor outlet for exhausting the vaporized water from the intermediate stream and a liquid outlet for discharging a product stream containing hydrocarbons substantially free of water. The heat releasing section has an inlet for receiving a second fluid having a higher energy than the intermediate stream, an outlet for discharging the second fluid, and a heat transfer surface for transferring heat from the second fluid to the heat absorbing section to vaporize the water.

The system also has a second vapor compressor in communication with the vapor outlet of the heat absorbing section of the film evaporator for compressing the vaporized water from the intermediate stream and delivering this compressed water vapor to the heat releasing section of either the vapor thermocompression evaporator or the film evaporator to transfer heat to the respective heat absorbing section.

DESCRIPTION OF THE PREFERRED EMBODIMENT

Figure 1:
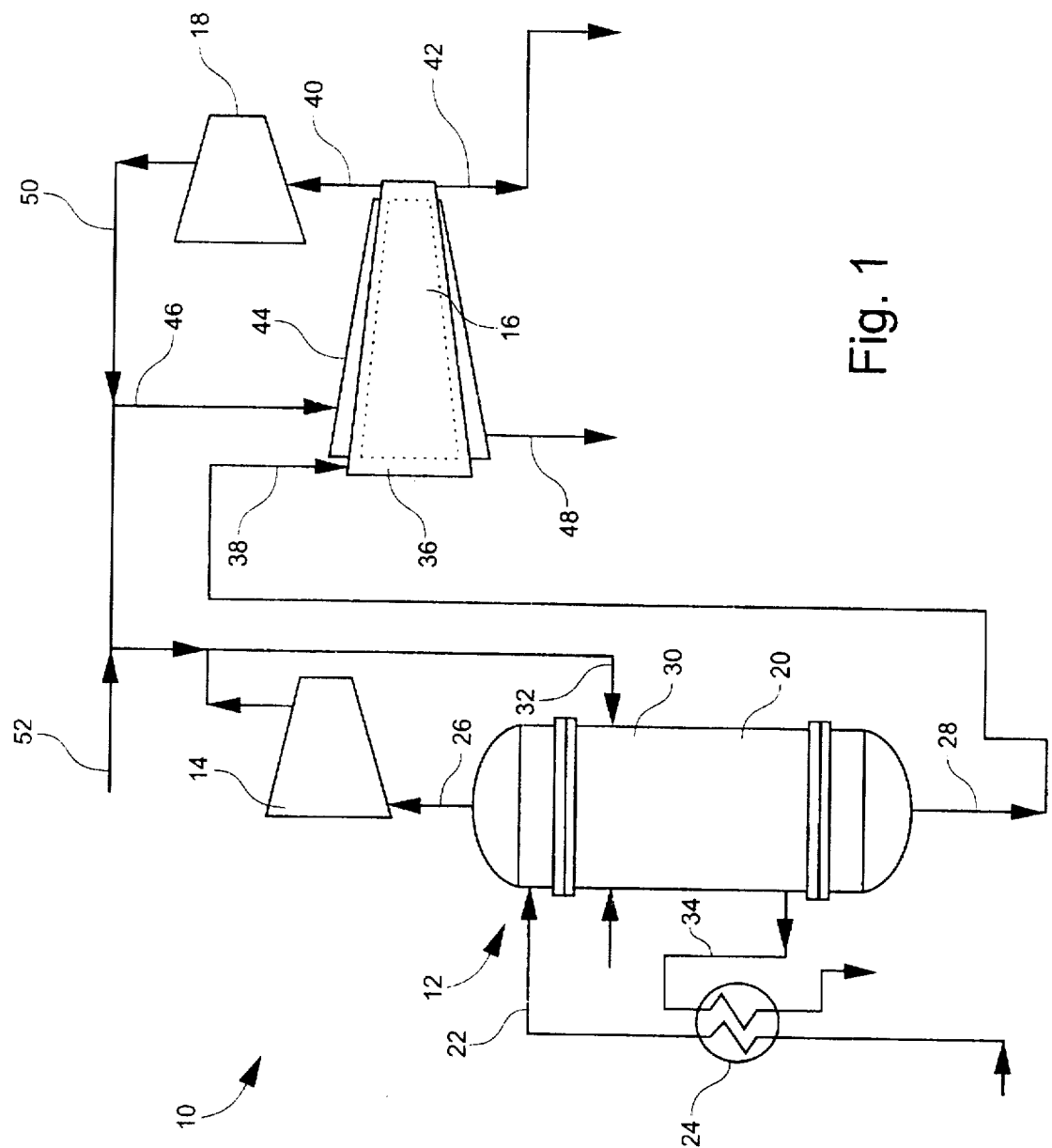
FIG. 1 is a schematic representation of the present invention.

FIG. 1 illustrates a preferred embodiment of the system of the present invention, basically including a vapor thermocompression evaporator 10, with an evaporator portion 12 and a first vapor compressor 14, a film evaporator 16 downstream of the vapor thermocompression evaporator 10, and a second vapor compressor 18.

While the system and method of the present invention applies to separate any liquid component from a liquid composition or mixture in which one component has a greater volatility than the remaining components of the liquid composition or mixture, the preferred embodiment will be discussed with respect to a liquid mixture of water and hydrocarbons, the hydrocarbons having a lesser volatility than the water.

The evaporator portion 12 of the vapor thermocompression evaporator 10 is a conventional evaporator having a heat absorbing section 20 with an inlet 22 for receiving an aqueous waste stream having hydrocarbons therein. The waste stream is preheated in preheater 24 before entering the heat absorbing section 20. The heat absorbing section 20 also has a vapor outlet 26 for exhausting the vaporized water, and a liquid outlet 28 for discharge of an intermediate stream containing the hydrocarbon and unvaporized water. The heat absorbing section 20 has a heat transfer surface (not shown) for transferring heat to the waste stream within the heat absorbing section 20 to vaporize a significant fraction of the water in the waste stream without appreciably vaporizing the hydrocarbon.

The evaporator portion 12 also has a heat releasing section 30 with a inlet 32 for receiving a first fluid having a higher energy than the waste stream within the heat absorbing section 20. The heat releasing section 30 also has an outlet 34 for discharging the first fluid from the heat releasing section 30. The fluid flowing through outlet 34 then provides heat to the incoming waste stream in the preheater 24, before being removed from the system. The heat releasing section 30 also has a heat transfer surface (not shown) for transferring heat from the higher energy first fluid to the waste stream in the heat absorbing section 20.

The evaporator portion 12 may be any conventional heat exchanger in which vapor is produced. The choice of the particular type of heat exchanger to be used as the evaporator portion 12 depends upon the constituents of the waste stream, the size of heat exchanger required, and other typical design factors that will be specific to the particular circumstances of each installation.

The vapor thermocompression evaporator 10 also has a first vapor compressor 14 in communication with the vapor outlet 26 of the heat absorbing section 20 for compressing the water vapor exhausting through the vapor outlet 26. The first vapor compressor 14 then delivers the compressed water vapor to the inlet 32 to the heat releasing section 30 as the first fluid having heat energy for transfer to the waste stream in the heat absorbing section 20. Preferably, the first fluid provided to the heat releasing section 30 is in vapor state and condenses, thus providing heat to be transferred to the heat absorbing section 20 by this condensation.

The film evaporator 16 has a heat absorbing section 36 that has an inlet 38 in communication with the liquid outlet 28 of the heat absorbing section 20 of the evaporator portion 12 for receiving the intermediate stream containing the hydrocarbon and the unvaporized water from the evaporator portion 12. The heat absorbing section 36 also has a vapor outlet 40 for exhausting the vaporized water from the intermediate stream in the heat absorbing section 36, and liquid outlet 42 for discharging a product stream containing the hydrocarbon substantially free of any water. The heat absorbing section 36 has a heat transfer surface (not shown) for transferring heat to the intermediate stream within the heat absorbing section 36 to vaporize substantially all of the water in the intermediate stream without appreciably vaporizing the hydrocarbon.

The film evaporator 16 also has a heat releasing section 44 which has an inlet 46 for receiving a second fluid having a higher energy than the intermediate stream and an outlet 48 for discharging the second fluid. The heat releasing section 44 also has a heat transfer surface (not shown) for transferring heat from the second fluid to the intermediate stream for vaporizing substantially all the water from the intermediate stream without appreciably vaporizing the hydrocarbon. Preferably, the second fluid condenses in the heat releasing section 44, thus transferring the heat released by condensation to the intermediate stream, and the condensate is then discharged from the outlet 48.

The second vapor compressor 18 is in communication with the vapor outlet 40 of the heat absorbing section 36 of the film evaporator 16. The second vapor compressor 18 compresses the water vapor exhausted through vapor outlet 40 and then exhausts the compressed water vapor into an outlet 50. Outlet 50 connects to the inlet 46 to the heat releasing section 44 of the film evaporator 16 and to the outlet 32 to the heat releasing section 30 of the evaporator portion 12. In this way, the compressed water vapor leaving the second vapor compressor 18 may be provided to the heat releasing section 44 of the film evaporator 16 or to the heat releasing section 30 of the evaporator portion 12, depending upon where this heat is most efficiently utilized. From this, it can be seen that the first fluid and the second fluid at higher energies than the waste stream and intermediate stream may be the same, such as compressed water vapor.

In the event that the compressed water vapor exiting the first vapor compressor 14 and the second vapor compressor 18 is insufficient to provide the entire amount of heat required to vaporize water in the evaporator portion 12 or the film evaporator 16, steam from outside the system may be selectively provided to either the heat releasing section 30 of the evaporator portion 12 or the heat releasing section 44 of the film evaporator 16 through outside steam line 52. Other sources of heat, such as electric or gas, may also be used to provide auxiliary heat, if needed.

The film evaporator 16 is preferably a horizontal, tapered-bore, agitated or wiped thin-film evaporator. It will be obvious to one with ordinary skill in the art that other film evaporators, horizontal or vertical, may also provide suitable vaporization of the remaining water in the intermediate stream, depending upon the hydrocarbons in the intermediate stream and other considerations that would affect the particular design choice. A film evaporator is preferred because of the ability to effectively vaporize the water if there are small temperature differences between the water and the fluid from which heat is transferred. Such an evaporator provides wetting of the heat transfer surface and improved heat transfer performance. Further, use of a film evaporator reduces the amount of fouling of the heat transfer surfaces in this application.

The evaporator portion 12 may be any conventional evaporator, depending upon the particular hydrocarbon(s) present in the waste stream, size considerations, and other typical design factors that may affect the design of the evaporator portion 12. The first vapor compressor 14 and the second vapor compressor 18 may be any conventional compressor, either mechanical or steam-jet, depending upon typical design factors such as cost, capacity, and space considerations.

In a preferred embodiment for processing five gallons per minute of textile chemical waste water, the vapor thermo-compression evaporator is a steam chest, single-pass, shell and tube heat exchanger with a mechanical-driven rotary lobe compressor, designed for one million BTU/hr heat transfer. This is coupled with a horizontal, tapered-bore, thin-film evaporator. The second compressor is also a mechanical-driven, rotary lobe compressor. With an incoming waste stream having about 1.0% by weight of hydrocarbon and residue and about 99.0% water, the product stream contains about 98% hydrocarbon and residue and about 2% water. This represents a total weight reduction of about 99%. This product stream may be used as is or further treated, as discussed in greater detail below.

In operation, a waste stream having a first constituent with a first relative volatility and at least one other constituent having a relative volatility lesser than the first constituent is fed to the preheater 24 in which heat is transferred to the waste stream to increase its temperature. Preferably, the first constituent is water and the other constituent is one or more hydrocarbons. The waste stream is then delivered into the vapor thermocompression evaporator 10 through the inlet 22 to the heat absorbing section 20 of the evaporator portion 12. Within the heat absorbing section 20 of the evaporator portion 12, heat is transferred to the waste stream to vaporize a significant fraction of the water without appreciably vaporizing the hydrocarbon, resulting in a vaporized fraction of the water that exits the heat absorbing section 20 through the vapor outlet 26 and an intermediate stream containing the hydrocarbon and unvaporized water that exits through the liquid outlet 28.

The water vapor leaving the vapor outlet 26 of the heat absorbing section 20 enters the first vapor compressor 14, wherein it is compressed. The compressed water vapor then flows into the inlet 32 to the heat releasing section 30, wherein it is circulated through the heat releasing section 30 to transfer heat therefrom to the waste stream within the heat absorbing section 20. Preferably, while within the heat releasing section 30, the water vapor condenses, and transfers this heat of condensation through the heat transfer surface to the waste stream within the heat absorbing section 20. The condensed water from the heat releasing section 30 then exits the heat releasing section 30 through the outlet 34 and circulates through the preheater 24 to transfer heat therefrom to the incoming waste stream.

If the compressed water vapor exiting the first vapor compressor 14 does not contain sufficient heat to transfer to the waste stream in the heat absorbing section 20 to vaporize the desired fraction of water, additional steam may be provided through outside steam line 52 into the heat absorbing section 20 to provide additional heat to vaporize the required fraction of water.

The intermediate stream, containing the hydrocarbon and the unvaporized water, passes through the liquid outlet 28 from the heat absorbing section 20 and into the heat absorbing section 36 of the film evaporator 16. The intermediate stream is then formed into film flow to aid with heat transfer to the stream. Within the heat absorbing section 36 of the film evaporator 16, heat is transferred to the intermediate stream such that substantially that all of the water is vaporized, without appreciably vaporizing the hydrocarbon. This results in a vaporized fraction of water and a product stream containing the hydrocarbon substantially free of water.

The water vapor exits the heat absorbing section 36 of the film evaporator 16 through the vapor outlet 40 and enters the second vapor compressor 18, wherein it is compressed. The compressed water vapor exits the second vapor compressor 18 through the second compressor outlet 50, from which it is delivered either to the inlet 46 to the heat releasing section 44 of the film evaporator 16 or to the inlet 32 to the heat releasing section 30 of the evaporator portion 12. In this way, most of the sensible heat of compression and the heat of vaporization of the water vapor may be recovered either in the film evaporator 16 or the vapor thermocompression evaporator 10, wherever it is most needed. Thus, most of this energy is conserved and is recycled to the system.

The water vapor delivered to the inlet 46 to the heat releasing section 44 of the film evaporator 16 enters the heat releasing section 44 to transfer heat through the heat transfer surface to the intermediate stream within the heat absorbing section 36. Preferably, the water vapor within the heat releasing section 44 condenses and provides this heat of condensation to the intermediate stream within the heat absorbing section 36 through the heat transfer surface. The condensed water from the heat releasing section 44 then exits the heat releasing section 44 through the outlet 48. The product stream, being hydrocarbon substantially free of water, exits the heat absorbing section 36 through liquid outlet 42.

Typically, the incoming waste stream containing the water and hydrocarbon has a hydrocarbon concentration of two weight percent or less. The intermediate stream leaving the vapor thermocompression evaporator 10 through the liquid outlet 28 may be between 25 and 60 weight percent hydrocarbon, but typically is between 30 and 40 weight percent hydrocarbon. The product stream exiting the film evaporator 16 through the liquid outlet 42 is generally greater than about 95 weight percent hydrocarbon, but typically between about 98 and 99 weight percent hydrocarbon. This product stream may be used alone to produce fuel, such as for boilers, as blending product for lubricants, or in other applications in which further separation of the hydrocarbon into any constituent hydrocarbons is unnecessary. The product stream may be further treated to separate various components of the hydrocarbon to increase market value to the chemical industry.

Figure 2:
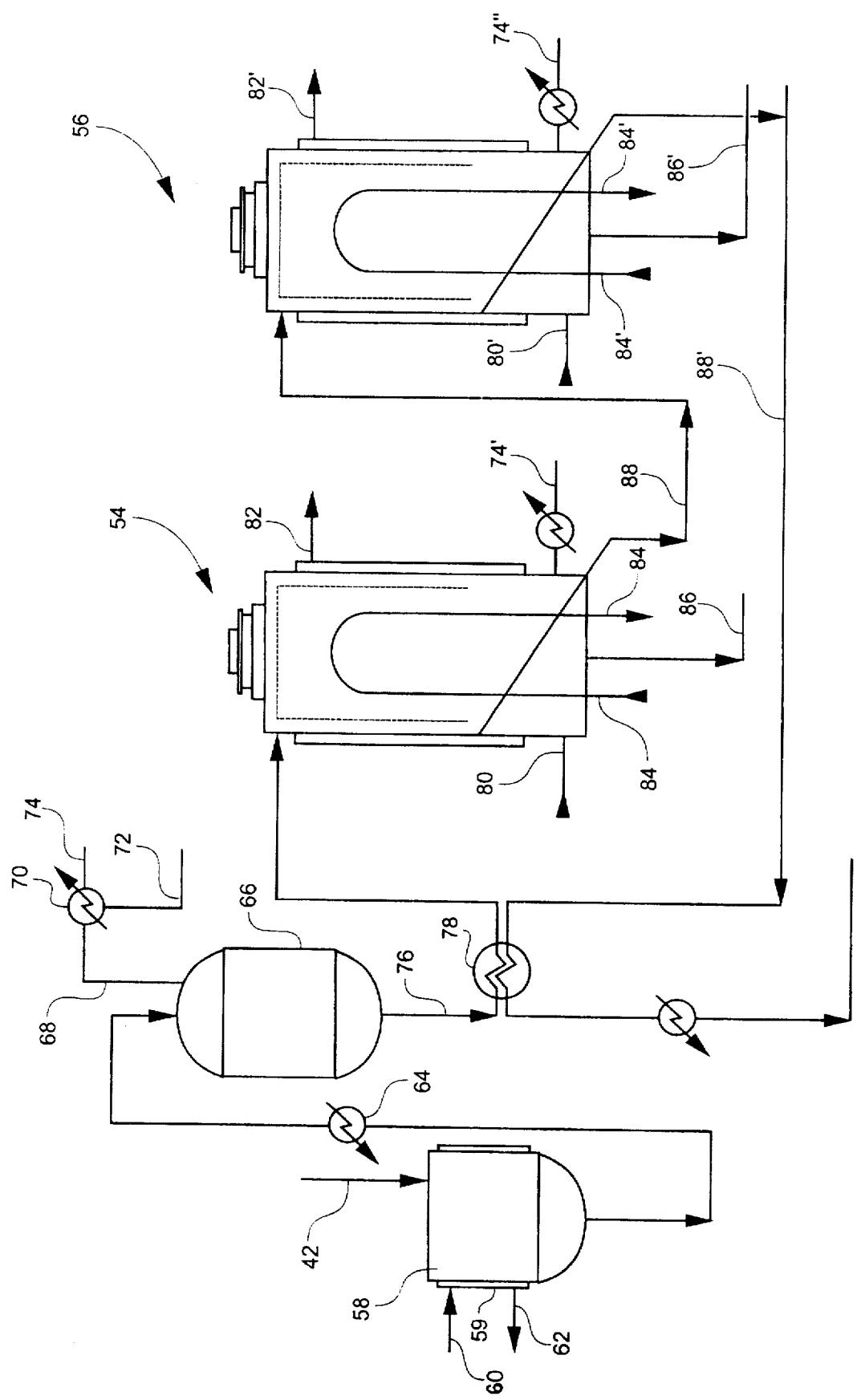
FIG. 2 is a schematic representation of additional processing of the product stream to separate the hydrocarbons into their respective fractions.

FIG. 2 illustrates a preferred embodiment of a system by which this further separation may be realized. In this embodiment, the separation is accomplished by use of molecular distillation. This molecular distillation step is conducted using a first molecular distillation unit 54 in series with a second molecular distillation unit 56. Molecular distillation units 54,56 may be of any conventional design, depending upon the nature of the hydrocarbons to be separated, space limitations, and other typical design considerations.

The product stream exiting liquid outlet 42 of the heat absorbing section 36 of the film evaporator 16 is heated, mixed, and degassed under vacuum to remove all residual water and light fraction hydrocarbons. This is accomplished by passing the product stream through a mixed holding tank 58 having a steam jacket 59, in which steam enters the jacket 59 through steam inlet 60 and condensed water exits the steam jacket 59 through outlet 62, to maintain the heat in the system, through a preheater 64, and into a degasser 66.

As a result of the heat added to the product stream, vaporization of any residual water and of light fraction hydrocarbons is accomplished. The degasser 66, which can be of any conventional design, then separates the vapor and liquid fractions of these materials. Preferably, the degasser 66 is of a packed-bed design to maximize the separation. The vaporized portion of the product stream within the degasser 66 then exits the degasser 66 through vapor outlet 68 into a cooler 70 which condenses this vapor into a light product stream exiting the cooler through outlet 72. The hydrocarbon fraction of the light product stream may be recovered by decantation. The vacuum within the degasser 66 is maintained through a conventional vacuum system having a cooler/cold trap for vacuum system protection and communicating with the degasser 66, such as at the cooler 70 indicated by numeral 74.

The liquid effluent of the degasser 66 exits through a liquid outlet 76 and passes through a preheater 78 and then into first molecular distillation unit 54. The distillation within the molecular distillation unit 54,56 occurs under high vacuum conditions in which the path of the recovered molecules between the evaporator section and the condenser section of the equipment is roughly in the order of magnitude of the diameter of the molecule. The vacuum is maintained by any conventional vacuum system in communication with molecular distillation units 54,56 such as indicated by numerals 74',74". Heat is provided to the molecular distillation units 54,56 through hot oil entering at hot oil supply 80,80' and exiting the molecular distillation units 54,56 at oil return 82,82'. Condensing in the molecular distillation units 54,56 is accomplished by using closed circuit tempered water systems 84,84'.

The product from the molecular distillation units 54,56 exits at product outlet 86,86'. The temperatures within the molecular distillation units 54,56 may be selected to distill and condense particular fractions of hydrocarbons such that each product outlet 86,86' contains a different hydrocarbon that has been separated from the product stream. The residue from molecular distillation unit 54 is provided as the working fluid for molecular distillation unit 56 through residue outlet 88. Residue from molecular distillation unit 56 is provided through residue outlet 88' to preheater 78 to preheat the hydrocarbon stream in the liquid outlet 76 from the degasser 66 being provided to molecular distillation unit 54. This residue stream may either be used as a discussed above or further separated into component hydrocarbons.

It will be obvious to one of ordinary skill in the art that the number of molecular distillation units utilized in series is not limited to two, but may be any number, depending upon the number of hydrocarbon constituents in the stream and the need to separate of the different hydrocarbon constituents.

This system is heat efficient by recovering heat throughout different stages of the process to minimize energy requirements to complete the process. The water which is provided through outlet 34 of the heat releasing section 30 of the evaporator portion 12 and the outlet 48 of the heat releasing section 44 of the film evaporator 16 may be sent back to the plant for reuse. Since this water is essentially distilled, with little or no organic content, it may be successfully used in emulsion makeup, boiler feed, cooling water feed, process wash water, demineralized water makeup, or any other uses for which feed water is necessary. It will be noted that generally more than 85 percent of the heat needed to boil the water in the incoming waste stream in the vapor thermocompression evaporator 10 is provided by the compressed vapor exiting the first vapor compressor 14. Any residual heat necessary is provided by steam, throughout outside steam lines 52, gas, electric heat, or compressed steam exiting the second compressor outlet 50.

This system and process results in a high heat efficiency, little or no chemical requirement, no reliance on filters or membranes which are prone to plugging and fouling, and does not generate waste of its own. This system and process also does not create the kind of sludges which are generated in coagulation and flocculation processes and, thus, does not require disposal facilities, such as landfills, for such sludge. This high heat efficiency does not require any additional heat recovery devices and results in a very low cost of operation.

Thus, it can be seen that this system and process has significant advantages over those currently used to reduce the water content of waste water streams or to recover valuable hydrocarbons from waste water streams.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A system for recovery of reusable constituents from a waste stream comprising at least a first constituent with a first relative volatility and a second constituent having a second relative volatility lesser than the first constituent, comprising:
   a. a vapor thermocompression evaporator, comprising:
      i. a heat absorbing section with an inlet for receiving the waste stream, means for vaporizing a significant fraction of the first constituent in the waste stream without appreciably vaporizing the second constituent, a vapor outlet for exhausting the vaporized fraction of the first constituent, and a liquid outlet for discharge of an intermediate stream comprising the second constituent and unvaporized first constituent;
      ii. a heat releasing section, with an inlet for receiving a first fluid having a higher energy than the waste stream, an outlet for discharging the first fluid, and means for transferring heat from the first fluid to the heat absorbing section to vaporize the first constituent therein;
      iii. a first vapor compressor in communication with the vapor outlet of the heat absorbing section for compressing the vaporized fraction of the first constituent and delivering the compressed vaporized fraction to the heat releasing section inlet as the first fluid having heat energy for transfer to the waste stream in the heat absorbing section;
   b. a film evaporator, comprising:
      i. a heat absorbing section having an inlet in communication with the liquid outlet of the heat absorbing section of the vapor thermocompression evaporator for receiving the intermediate stream, means for vaporizing substantially all of the first constituent in the intermediate stream without appreciably vaporizing the second constituent, a vapor outlet for exhausting the vaporized first constituent from the intermediate stream, and a liquid outlet for discharging a product stream comprising the second constituent substantially free of the first constituent;
      ii. a heat releasing section, with an inlet for receiving a second fluid having a higher energy than the intermediate stream, an outlet for discharging the second fluid, and means for transferring heat from the second fluid to the heat absorbing section to vaporize the first constituent; and
   c. a second vapor compressor in communication with the vapor outlet of the heat absorbing section of the film evaporator for compressing the vaporized first constituent from the intermediate stream and delivering the compressed vaporized first constituent to the heat releasing section of at least one of the vapor thermocompression evaporator and the film evaporator to transfer heat to the respective heat absorbing section.

2. A method for recovery of reusable constituents from a waste stream comprising at least a first constituent with a first relative volatility and a second constituent having a second relative volatility lesser than the first constituent, comprising the steps of:
   a. delivering the waste stream to a vapor thermocompression evaporation unit;
   b. transferring heat to the waste stream to vaporize a significant fraction of the first constituent without appreciably vaporizing the second constituent, resulting in a vaporized fraction of the first constituent and an intermediate stream comprising the second constituent and the unvaporized first constituent;
   c. compressing the vaporized fraction of the first constituent;
   d. circulating the compressed vaporized fraction of the first constituent to transfer heat therefrom to the waste stream within the vapor thermocompression unit;
   e. delivering the intermediate stream to a film evaporator;
   f. forming the intermediate stream into film flow to aid with heat transfer to the stream;
   g. transferring heat to the intermediate stream film to vaporize substantially all of the first constituent without appreciably vaporizing the second constituent, resulting in a vaporized fraction of the first constituent and a product stream comprising the second constituent substantially free of the first constituent;
   h. compressing the vaporized fraction of the first constituent from the film evaporator; and
   i. circulating the compressed vaporized fraction of the first constituent from the film evaporator to transfer heat therefrom to at least one of the waste stream in the vapor thermocompression unit and the intermediate stream within the film evaporator.

3. A system for recovery of hydrocarbon constituents from a waste stream comprising water and a hydrocarbon fraction having at least one hydrocarbon constituent, the hydrocarbon fraction being less volatile than the water, comprising:
   a. a preheater to transfer heat to the waste stream;
   b. a vapor thermocompression evaporator, comprising:
      i. a heat absorbing section with an inlet for receiving the waste stream, means for vaporizing a significant fraction of the water without appreciably vaporizing the hydrocarbon, a vapor outlet for exhausting the water vapor, and a liquid outlet for discharge of an intermediate stream comprising the hydrocarbon and unvaporized water;
      ii. a heat releasing section, with an inlet for receiving water vapor having a higher energy than the waste stream, an outlet for discharging condensed water to the preheater, and means for condensing the water vapor and transferring heat from the condensing water vapor to the heat absorbing section to vaporize the water from the waste stream, wherein the condensed water circulates through the preheater to preheat the incoming waste stream;

iii. a first vapor compressor in communication with the vapor outlet of the heat absorbing section for compressing the water vapor and delivering the compressed water vapor to the heat releasing section inlet and into the heat releasing section to be used as fluid from which heat is transferred to the waste stream in the heat absorbing section;

c. a film evaporator, comprising:

i. a heat absorbing section having an inlet in communication with the liquid outlet of the heat absorbing section of the vapor thermocompression evaporator for receiving the intermediate stream, means for vaporizing substantially all of the water without appreciably vaporizing the hydrocarbon in which the intermediate stream is formed into a film, a vapor outlet for exhausting the water vapor from the intermediate stream, and a liquid outlet for discharging a product stream comprising the hydrocarbon substantially free of water;

ii. a heat releasing section, with an inlet for receiving water vapor having a higher energy than the intermediate stream, an outlet for discharging condensed water, and means for condensing the water vapor and transferring heat from the condensing water vapor to the heat absorbing section to vaporize the water from the intermediate stream; and d. a second vapor compressor in communication with the vapor outlet of the heat absorbing section of the film evaporator for compressing the water vapor from the intermediate stream and delivering the compressed water vapor to the heat releasing section of at least one of the vapor thermocompression evaporator and the film evaporator to transfer heat to the respective heat absorbing section.

* * * * *